United States Patent [19]
Haraguchi

[11] Patent Number: 6,061,530
[45] Date of Patent: May 9, 2000

[54] CAMERA HAVING A FACILITY FOR CHANGING INFORMATION RECORDED ON FILM

[75] Inventor: Shosuke Haraguchi, Yokohama, Japan

[73] Assignee: Canon Kabushiki Kaisha, Tokyo, Japan

[21] Appl. No.: 09/104,520

[22] Filed: Jun. 25, 1998

[30] Foreign Application Priority Data

Jun. 30, 1997 [JP] Japan .................................... 9-174594
Dec. 24, 1997 [JP] Japan .................................... 9-365957

[51] Int. Cl.7 .............................. G03B 17/24; G03B 1/00

[52] U.S. Cl. ........................... 396/319; 396/406; 396/410

[58] Field of Search ..................................... 396/310, 311, 396/319, 320, 387, 389, 390, 406, 410

[56] References Cited

U.S. PATENT DOCUMENTS

| | | | |
|---|---|---|---|
| 5,335,029 | 8/1994 | Itoh et al. | 396/311 |
| 5,555,047 | 9/1996 | Tsuji et al. | 396/319 |
| 5,701,529 | 12/1997 | Yokonuma et al. | 396/310 |
| 5,737,654 | 4/1998 | Ishihara | 396/319 |
| 5,854,952 | 12/1998 | Terada | 396/413 |

*Primary Examiner*—Eddie C. Lee
*Attorney, Agent, or Firm*—Robin, Blecker & Daley

[57] ABSTRACT

An apparatus, such as a camera, adapted for a film having an information recording part, includes a recording device which records information on the information recording part of the film, an operation device which issues an instruction for rewinding the film, and a changing device which changes, in response to the film rewinding instruction issued by the operation device, the information recorded on the information recording part of the film by the recording device.

6 Claims, 7 Drawing Sheets

CAMERA HAVING A FACILITY FOR CHANGING INFORMATION RECORDED ON FILM

BACKGROUND OF THE INVENTION

1. Field of the Invention

The present invention relates to an apparatus, such as a camera, capable of recording magnetic information on a film and rewriting the magnetic information recorded on the film.

2. Description of Related Art

In recent years, there are being provided films and cameras of a system called the Advanced Photo System (APS), in which magnetic information is recorded on a silver-halide film having magnetic substance pigment, by using a magnetic head mounted in the camera.

The above magnetic information is called "IX information". The IX information includes prescribed information of varied kinds, such as information for improving print quality, information for recording photo-taking data, etc. For example, as disclosed in Japanese Patent Application No. HEI 6-133888, the IX information includes information to be inputted by the camera user to inform a photofinishing laboratory of what is desired by the user, such as a designated number of prints, etc.

Under the above background, there is known a camera of the APS system capable of rewriting, after completion of a photo-taking operation, the IX information recorded on the basis of data obtained immediately before the photo-taking operation. The camera of such a kind is provided with an additional operation button for rewriting the IX information and is arranged to be inoperable unless the operation button continues being pushed for a predetermined period of time for the purpose of preventing an erroneous or inadvertent operation on the operation button.

However, since the above arrangement for preventing an erroneous operation requires the camera operator to continue pushing the operation button for the predetermined period of time to cause the camera to accept the operation, it has been troublesome. Besides, the addition of the rewriting operation button causes an increase in the number of operation members, thereby making the structural arrangement of the camera complex and also increasing the cost of the camera.

BRIEF SUMMARY OF THE INVENTION

In accordance with one aspect of the invention, there is provided an apparatus, such as a camera, adapted for a film having an information recording part, which comprises a recording device which records information on the information recording part of the film, an operation device which issues an instruction for rewinding the film, and a changing device which changes, in response to the film rewinding instruction issued by the operation device, the information recorded on the information recording part of the film by the recording device, so that the information recorded on the information recording part of the film can be changed with excellent operability without causing the structural arrangement of the camera to become complex.

The above and other aspects of the invention will become apparent from the following detailed description of preferred embodiments thereof taken in conjunction with the accompanying drawings.

DETAILED DESCRIPTION OF THE INVENTION

Hereinafter, a preferred embodiment of the invention will be described in detail with reference to the drawings.

Figure 1:
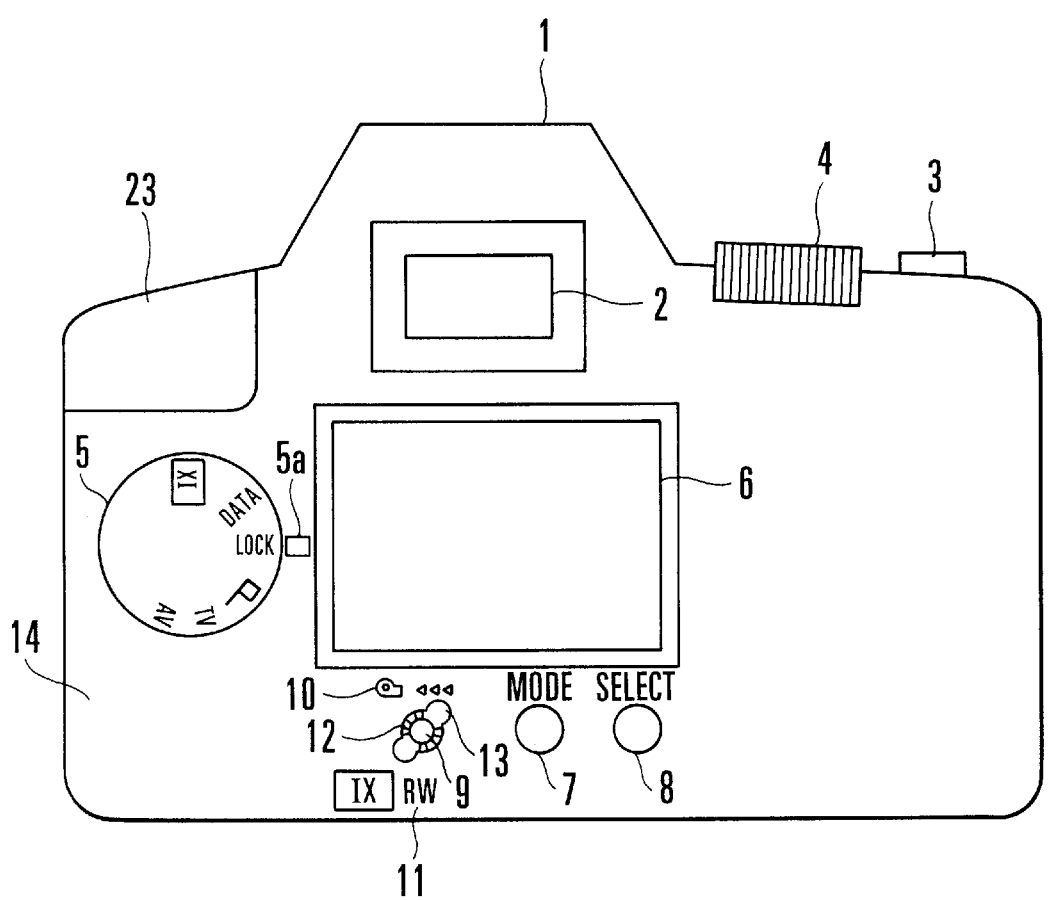
FIG. 1 is a rear view of a camera according to an embodiment of the invention.

FIG. 1 is a rear view of a camera according to an embodiment of the invention, illustrating a layout of operation members of the camera.

Figure 2:
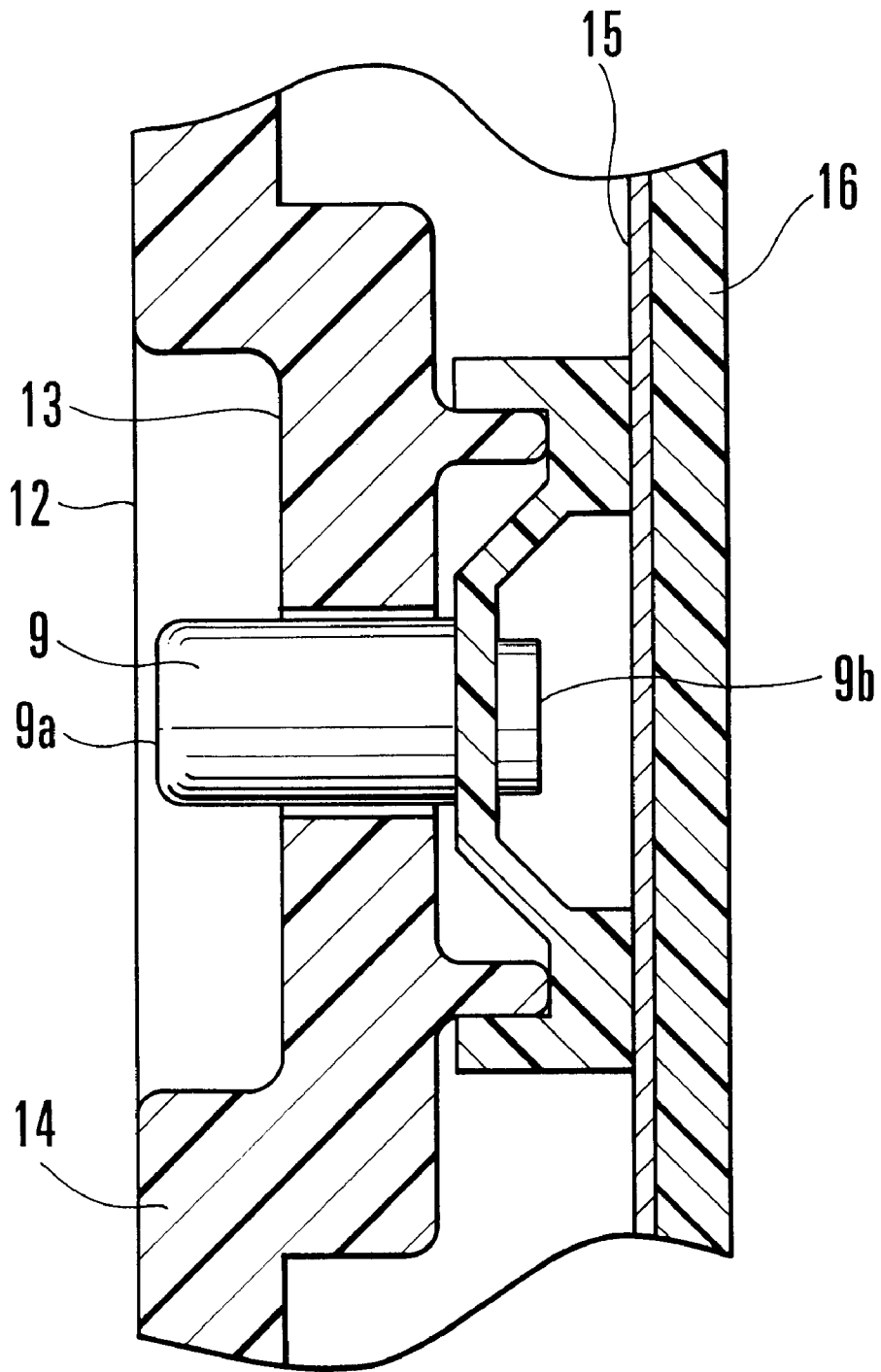
FIG. 2 is a sectional view showing the structure of an RW button of the camera shown in FIG. 1.
Figure 3:
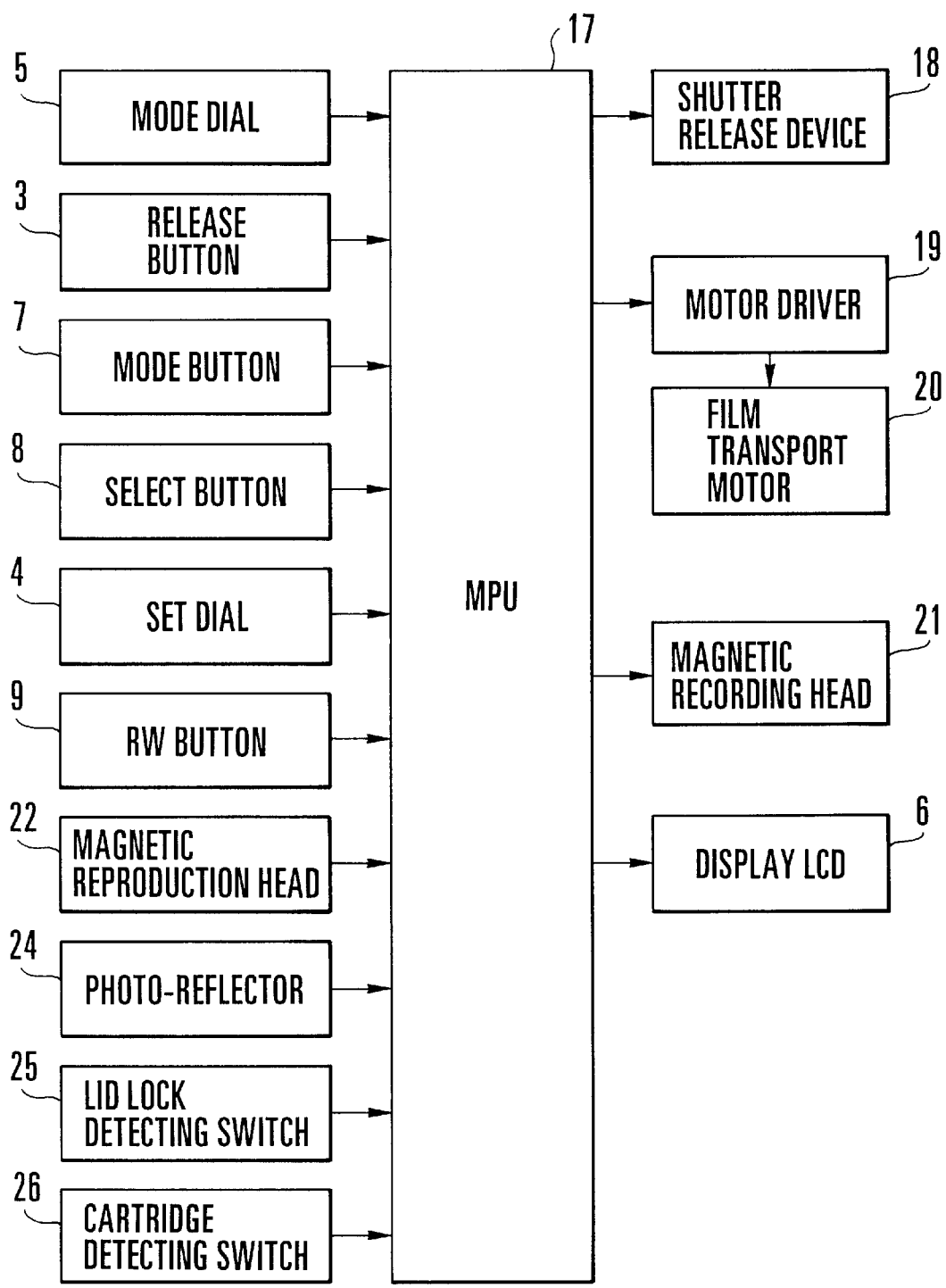
FIG. 3 is a block diagram showing the electrical arrangement of the camera shown in FIG. 1.
Figure 4:
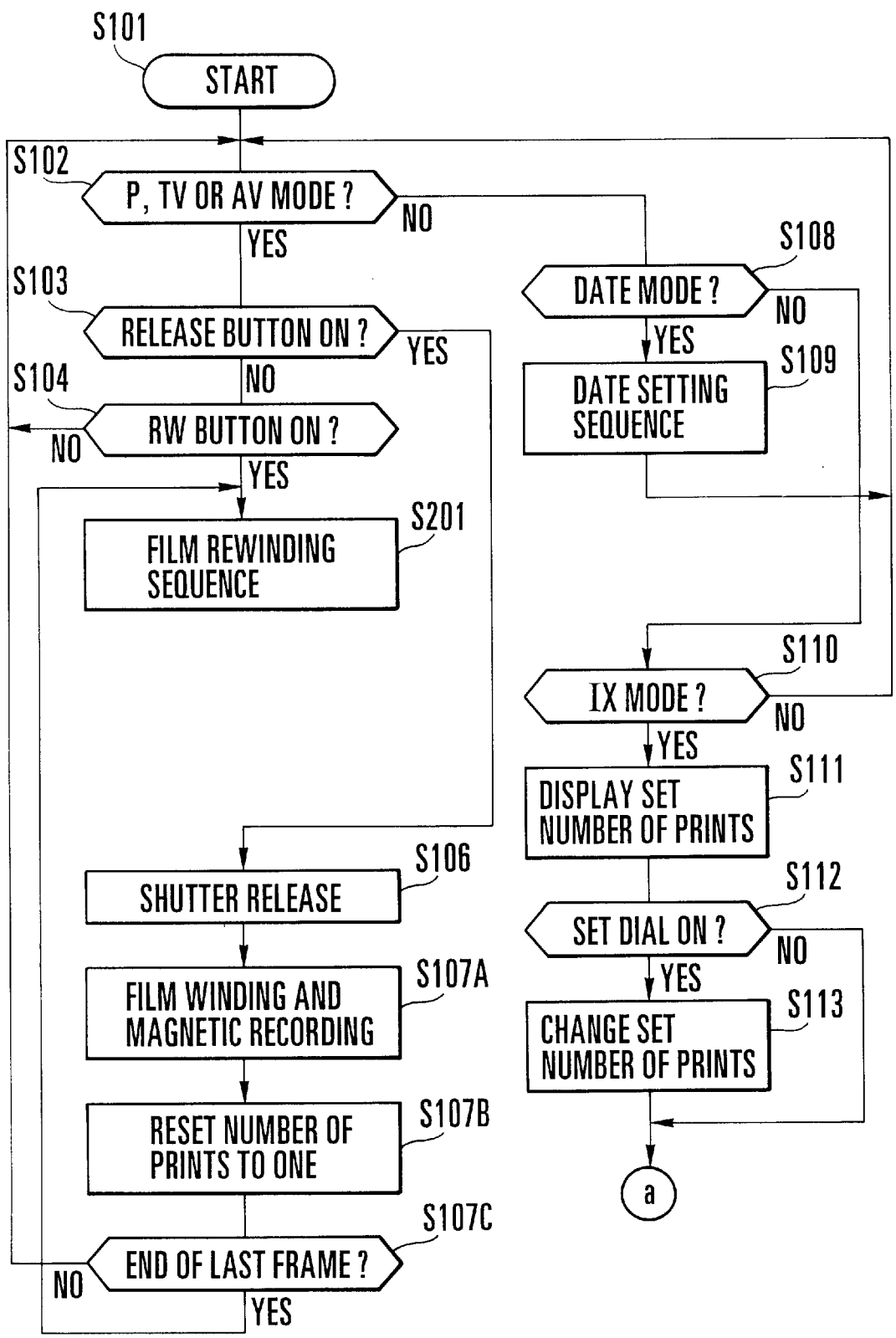
FIG. 4 is a flow chart showing a flow of operation of a microcomputer 17 shown in FIG. 3.
Figure 5:
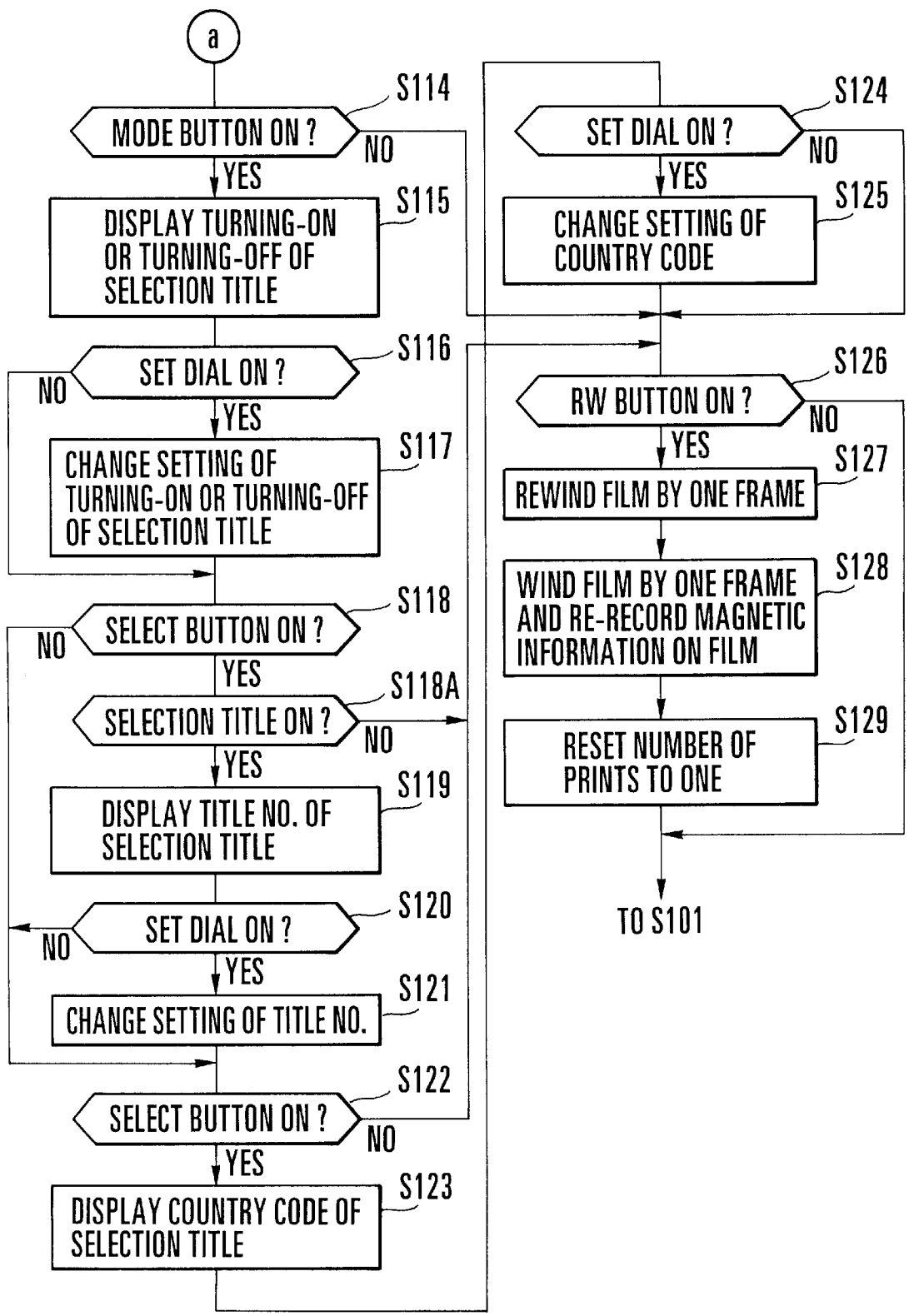
FIG. 5 is a flow chart showing the flow of operation continuing from FIG. 4.

FIG. 2 shows the structure of an operation member for changing recorded information. FIG. 3 is a block diagram showing the arrangement of a control circuit of the camera. FIGS. 4 and 5 are flow charts showing a flow of operation of a microcomputer (MPU) 17 shown in FIG. 3.

Referring to FIG. 1, there are illustrated a camera body 1, a viewfinder 2 and a cartridge chamber lid 23. The camera in the embodiment is adapted for the APS (Advanced Photo System), and is arranged to be loaded with an APS film cartridge by opening the cartridge chamber lid 23. In the APS film cartridge, a silver-halide film having magnetic substance pigment is accommodated. Thus, the camera in the embodiment is arranged to magnetically record, on the film, IX information in correspondence to each of photo-taking frames of the film.

The camera is further provided with a release button 3, a set dial 4 for changing set values of various kinds, a mode dial 5, and an index 5a. One of various modes is set by adjusting one of mode indications on the mode dial 5 to the index 5a. In the case of FIG. 1, the mode dial 5 is set to the position of a LOCK mode, which is to be set when the camera is not used. With the camera set in the LOCK mode, the camera remains inoperable even if any of operation members provided on the camera is operated. In taking a shot, on the other hand, one of indications indicative of P, TV and AV modes on the mode dial 5 is adjusted to the index 5a. The P mode means a program mode, in which a shutter time and an aperture value are automatically decided to obtain an apposite exposure. The TV mode means a shutter time priority mode, in which control is performed to obtain an apposite exposure for a shutter time set by the user. The AV mode means an aperture priority mode, in which control is performed to obtain an apposite exposure for an aperture value set by the user. The mode setting positions of the mode dial 5 further include indications indicative of a DATE mode and an IX mode. The DATE mode is a mode for setting a date, and no photo-taking action is allowed in the DATE mode. The IX mode is a mode for setting IX information and matters related thereto, and no photo-taking action is allowed in the IX mode.

A display LCD 6 is arranged to display a shutter time, an aperture value, etc., obtained in the P mode, the TV mode or the AV mode. Information of various kinds in the DATE mode or the IX mode is also displayed on the display LCD 6. A MODE button 7 and a SELECT button 8 are members to be operated for inputting information in the DATE mode or in the IX mode.

An RW button 9 is arranged to be operated both as a record changing operation member for changing recorded information and a film rewinding operation member for rewinding the film. An indication part 10 is provided to indicate that the RW button 9 is functioning as the film rewinding operation member. An indication part 11 is provided to indicate that the RW button 9 is functioning as the record changing operation member. Thus, the indication part 11 reads "[IX] RW", which indicates that the RW button 9 functions as the record changing operation member only when the RW button 9 is pushed in the IX mode.

The RW button 9 functions as the film rewinding operation member only when the RW button 9 is pushed in one of the P mode, the TV mode and the AV mode, which are photo-taking modes. In the indication "[IX] RW", "RW" is mainly intended to stand for a word "rewriting" and may be construed as standing also for a word "rewinding". Since the IX information is rewritten by rewinding the film as much as one frame portion thereof, and since the IX information recorded on the film leader part is rewritten while rewinding the film, the camera can be adequately operated by the user without any confusion with the symbol "RW" construed either as "rewriting" or as "rewinding".

In the case of the embodiment, one and the same RW button 9 is used both as the film rewinding operation member and as the record changing operation member. This arrangement thus prevents an increase in the number of operation members to simplify the structural arrangement of the camera and to permit reduction in cost. Besides, if the two operation members are arranged discretely from each other and respectively indicated as "RW", there arises the possibility of an erroneous operation with the film rewinding operation member mistaken for the record changing operation member, and vice versa.

Further, the RW button 9 is provided with an erroneous operation preventing means. More specifically, the surroundings of the RW button 9 are covered with a protector 12 and are provided with a groove part 13 which is formed in such a shape as to permit only an intentional operation on the RW button 9 with a fingernail or the like.

Next, the details of the structure of the RW button 9 are described with reference to FIG. 2.

Referring to FIG. 2, the RW button 9 is a conductive rubber switch having a key top part 9a and a conductive part 9b. The RW button 9 is mounted on a back cover 14 of the camera. Reference numeral 15 denotes a printed circuit board, and reference numeral 16 denotes a mount base.

When the key top part 9a is pushed by the user, the conductive part 9b is pushed against the printed circuit board 15. Then, a pattern provided on the printed circuit board 15 becomes conductive to perform a switching action. The height of the protector 12 is set to be higher than that of the key top part 9a. The groove part 13 is formed in a shape large enough to permit a fingernail to enter there and deep enough to have the key top part 9a pushed to a sufficient extent for switching. The planar shape of the protector 12 is shown by way of example in FIG. 1. However, the protector 12 may be arranged to be in a shape different from that shown in FIG. 1.

FIG. 3 is a block diagram showing the electrical arrangement of the camera having the above construction. All parts that are the same as those shown in FIG. 1 are indicated by the same reference numerals as in FIG. 1.

Referring to FIG. 3, an MPU 17 is a microcomputer arranged to control the camera. In FIG. 3, all members that are arranged to supply signals to the MPU 17 are shown on the left side of FIG. 3. These members include the mode dial 5, the release button 3, the MODE button 7, the SELECT button 8, the set dial 4 and the RW button 9 which are shown in FIG. 1, and a magnetic reproduction head 22, a photo-reflector 24, a lid lock detecting switch 25 and a cartridge detecting switch 26.

The mode dial 5 can be set at any of six stop positions. The mode dial 5 generates a signal of three bits at each of the six stop positions thereof and supplies the signal to the MPU 17. When the release button 3 is pushed, a release signal is inputted to the MPU 17. When the MODE button 7, the SELECT button 8 or the RW button 9 is pushed, an ON signal is inputted to the MPU 17. When the set dial 4 is turned by the user, a signal indicative of the rotating direction of the set dial 4 is continuously inputted to the MPU 17.

The magnetic reproduction head 22 is provided for a so-called MRC (film mid-roll changing and reloading) function of the APS. In the case of the MRC function, the magnetic reproduction head 22 is used for judging each frame of the film to be exposed (used) or unexposed (unused) by detecting the presence or absence of the magnetic record of information in carrying out a search for the leader part of unexposed frames. The photo-reflector 24 is used for detecting perforations of the film during transportation of the film to detect the movement of the film and find the position of a photo-taking image plane. The lid lock detecting switch 25 is interlocked with a lock member of the cartridge chamber lid 23 and is arranged to detect a locked state of the cartridge chamber lid 23. The cartridge detecting switch 26 is provided for detecting the presence or absence of a film cartridge (not shown).

On the output side of the MPU 17, there are provided the following parts.

A shutter release device 18 is arranged to expose the film to light by driving a shutter which is not shown. The details of the shutter are omitted from description. A motor driver 19 is arranged to drive a film transport motor 20 for winding and rewinding the film. A magnetic recording head 21 is disposed to be able to come into contact with a surface having magnetic substance pigment on the base side of the film and to record there photo-taking data for each photo-taking frame as magnetic information during a film winding process immediately after a shot is taken on the frame. The display LCD 6 is disposed on the back cover of the camera, as shown in FIG. 1, to display information of various kinds.

FIGS. 4 and 5 are flow charts showing a flow of operation of the MPU 17 (microcomputer). The operation of the camera arranged as described above is described below referring to these flow charts which show in a simplified manner a general flow of operation to be carried out with the camera loaded with a film.

At a step S101, the MPU 17 begins to operate. At a step S102, a check is made to find if any of the P mode, TV mode and AV mode which are photo-taking modes is selected by the mode dial 5. If so, the flow proceeds to a step S103. If not, the flow proceeds to a step S108. At the step S108, a check is made to find if the DATE mode is selected. If not, the flow proceeds to a step S110. At the step S110, a check is made to find if the IX mode is selected. If not, it indicates that the camera is set in the LOCK mode. Therefore, the flow returns to the step S101 to repeat the same steps.

In a case where the P mode, the TV mode or the AV mode is found to be selected at the step S102, the flow proceeds to the step S103 as mentioned above. At the step S103, a check is made for the state of the release button 3. If the release button 3 is found to be in an on-state, the flow proceeds to a step S106. If not, the flow proceeds to a step S104. At the step S106, an exposure action is performed on the film by actuating the shutter release device 18. At the next step S107A, the motor driver 19 is caused to drive the film transport motor 20 to perform a film winding action. At the same time, the magnetic recording head 21 is caused to record magnetic information at an applicable photo-taking frame. After these actions, the flow proceeds to a step S107B. At the step S107B, information about the number of prints included in the IX information is reset to one. At a step S107C, a check is made to find if the frame currently used for photo-taking is the last frame. If not, the flow returns to the step S101.

In cases where the release button 3 is found to be in an off-state at the step S103 and the RW button 9 is found to be in an on-state at the next step S104, or where the current frame is found to be the last frame at the step S107C, the flow proceeds to a step S201 for a film rewinding sequence. The details of the film rewinding sequence will be described in detail later. In the case of the embodiment, the camera is provided with the magnetic reproduction head 22 as shown in FIG. 3 and has the MRC function (for replacing a film with another while it is still midway of use or for reloading it later) as mentioned above. Therefore, it is possible that a film-state indication which is provided on the film cartridge can be set to indicate "partially used" after rewinding of the film and the film can be reloaded to resume use of it.

Next, in a case where the DATE mode is selected, the operation of the camera is as follows.

With the DATE mode selected, the flow proceeds from the step S108 to a step S109. At the step S109, a date setting sequence is carried out. Since the date setting sequence is provided for setting data related to date to be recorded as the IX information, no photo-taking action is allowed. Under this condition, a recording mode in the DATE mode is displayed at the display LCD 6. More specifically, the display LCD 6 displays one of date recording modes, i.e., a recording off mode, a first recording mode and a second recording mode. The display of the recording mode display can be changed from one recording mode over to another in a cycle by pushing the MODE button 7.

During this process, the date data is recorded in the order of year, month and day in the first recording mode, and in the order of month, day and year in the second recording mode. When the SELECT button 8 is pushed in the first recording mode or in the second recording mode, the displays of year, month and day on the display LCD 6 come to flicker one after another. Under this condition, the data at the flickering display part can be changed by turning the set dial 4. After the end of the date setting sequence, when the DATE mode is shifted to some other mode, the flow of operation returns to the step S101 to repeat the flow of steps beginning with the step S102.

In a case where the IX mode is selected, the flow of operation proceeds from the step S110 to a step S111. At the step S111, a set value of the number of prints to be recorded as the IX information is displayed on the display LCD 6. The number of prints is reset for every frame. The default value of the number of prints is one. After the step S111, the flow proceeds to a step S112. At the step S112, a check is made to find if the set dial 4 is in an on-state, i.e., if the set dial 4 is operated. If so, the flow proceeds to a step S113. At the step S113, the set value of the number of prints is changed by incrementing or decrementing it. The set value thus changed is displayed on the display LCD 6.

In a case where the set dial 4 is found at the step S112 to be in an off-state (not operated) or where the changing action on the set value of the number of prints finishes, the flow proceeds to a step S114 of FIG. 5.

At the step S114 of FIG. 5, a check is made to find if the MODE button 7 is in an on-state. If not, the flow proceeds to a step S126. If so, the flow proceeds to a step S115. At the step S115, a display of the turning-on or turning-off of a selection title to be recorded as the IX information is made on the display LCD 6. At the next step S116, a check is made to find if the set dial 4 is in an on-state. If so, the flow proceeds to a step S117. At the step S117, the setting of the turning-on or turning-off of the selection title is changed and displayed on the display LCD 6. The flow then proceeds to a step S118. If the set dial 4 is found at the step S116 to be not in an on-state, the flow proceeds directly to the step S118.

At the step S118, a check is made to find if the SELECT button 8 is turned on. If so, the flow proceeds to a step S118A. At the step S118A, a check is made to find if the selection title is turned on. If so, the flow proceeds to a step S119. At the step S119, the title No. of the selection title is displayed on the display LCD 6. The title No. is set according to the specifications of the APS system, which are omitted from description here. At the next step S120, a check is made to find if the set dial 4 is in an on-state. If so, the flow proceeds to a step S121 to change the setting of the title No. The new title No. is displayed on the display LCD 6. At a step S122, a check is made to find if the SELECT button 8 is turned on. If so, the flow proceeds to a step S123 to display the country code of the selection title. The country code corresponds to one of the country codes specified by the APS which include codes 01 to 12. In the case of the embodiment, these country codes are arranged to be displayed in abbreviations of country names, such as "JPN", "USA", etc., to make them clearly understandable.

In a case where the SELECT button 8 is found at the step S118 to be in an off-state or where the set dial 4 is found at the step S120 to be in an off-state, the flow proceeds to the above-stated step S122. Further, in a case where the selection title is found at the step S118A to be not in an on-state or where the SELECT button 8 is found at the step S122 to be not in an on-state, the flow proceeds to the step S126.

At a step S124, a check is made to find if the set dial 4 is in an on-state (operated). If not, the flow proceeds to the step S126. If so, the flow proceeds to a step S125. At the step S125, a currently set country code is changed. The newly set country code is displayed on the display LCD 6, and the flow proceeds to the step S126.

The steps S110 to S125 are provided for enabling the user to set as desired the variable setting of the IX information. The set values changed by the user are generally reflected in a shot taken on the next frame. In rewriting the IX information for the exposed frame, the rewriting action is carried out by pushing the RW button 9 while the mode dial 5 is in the position of selecting the IX mode.

At the next step S126, a check is made to find if the RW button 9 is in an on-state. If not, the flow returns to the step S101 of FIG. 4. If so, the flow proceeds to a step S127. At the step S127, the film is rewound to an extent of one frame by controlling the driving action of the film transport motor 20 through the motor driver 19 according to a detection signal coming from the photo-reflector 24. At the next step S128, the film is wound up back to its previous position. During this film winding process, the magnetic head 21 is caused to rerecord, i.e., rewrite, magnetic information on the film as the IX information before the film is brought back to the previous position. At a step S129, at about the same time as the above-stated magnetic information rewriting action, the set value of the number of prints included in the IX information is reset to one. The camera then takes a standby state for a photo-taking action on the next frame. The flow then returns to the step S101 of FIG. 4.

The details of the film rewinding sequence to be executed at the step S201 of FIG. 4 are next described below with reference to flow charts shown in FIGS. 6 and 7.

Figure 6:
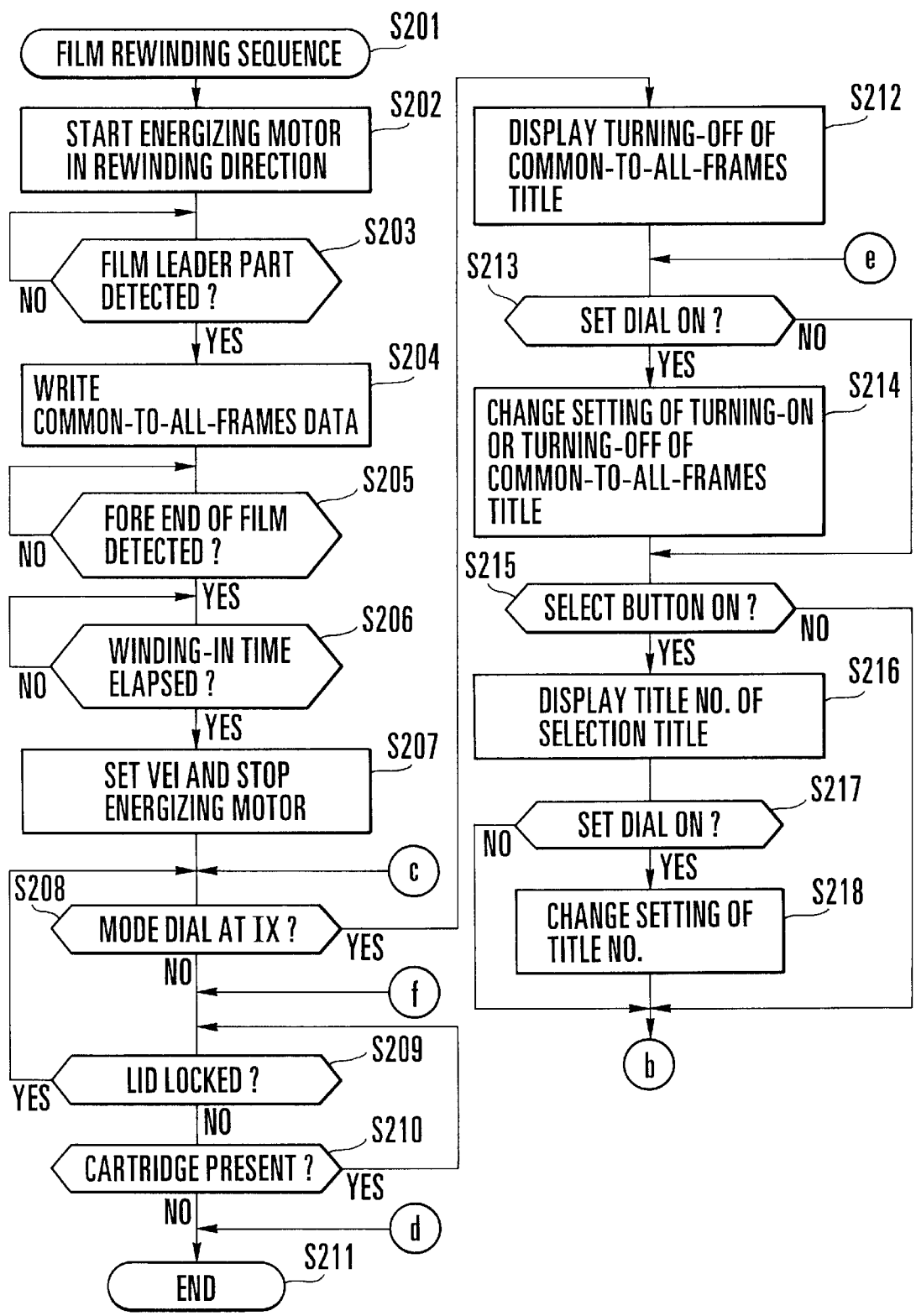
FIG. 6 is a flow chart showing in part a film rewinding sequence shown in FIG. 4.

Referring to FIG. 6, with the flow of operation shifted to the film rewinding sequence of the step S201, the flow proceeds to a step S202. At the step S202, the MPU 17 causes the motor driver 19 to begin to energize the film transport motor 20 in the direction of film rewinding. A film rewinding action of the film transport motor 20 begins. While the film rewinding action is in process, the MPU 17 continues to detect the movement of the film through a signal coming from the photo-reflector 24. At the next step S203, a check is made for the leader part of the film. When the leader part of the film is detected with the first exposed frame of the film passing a prescribed position, the flow proceeds to a step S204. At the step S204, the magnetic recording head 21 is caused to record common-to-all-frames data on the film.

The common-to-all-frames data is information to be magnetically recorded in the leader part of the photo-taking film and is standardized by the APS system. The common-to-all-frames data includes information on the presence or absence of FTPM designating a selection title and image printing conditions, designation of character printing priority to be made in printing photo-taking data, etc.

After the step S204, the flow proceeds to a step S205. At the step S205, a check is made for detection of the fore end of the film. When the fore end of the film is detected, the flow proceeds to a step S206. At the step S206, the flow waits for the lapse of a period of time required for winding the film into the film cartridge. At the next step S207, a visual exposure status indicator (VEI) (or, a double-exposure protector (DEP)) of the film cartridge is set, and the supply of a current to the film transport motor 20 is brought to a stop. In this state, the flow of operation proceeds to a step S208. At the step S208, a check is made to find if the mode dial 5 is in the position of the IX mode. If not, the flow proceeds to a step S209. At the step S209, a check is made for the locked state of the cartridge chamber lid 23. If the cartridge chamber lid is found to be unlocked, the flow proceeds to a step S210. At the step S210, a check is made for the state of the cartridge detecting switch 26. If the film cartridge is thus found to have been taken out from the cartridge chamber of the camera, the flow proceeds to a step S211 to terminate this sequence of processes.

If the mode dial 5 is found at the step S208 to be in the position of the IX mode, the flow proceeds to a step S212. At the step S212, a display of the turning-off of a common-to-all-frames title is made on the display LCD 6. At a step S213, a check is made for the state of the set dial 4. If the set dial 4 is found to be in an on-state, the flow proceeds to a step S214 to change the display of the turning-on or turning-off of a common-to-all-frames title. At a step S215, a check is made to find if the SELECT button 8 is in an on-state. If not, the flow immediately proceeds to a step S219 shown in FIG. 7. If so, the flow proceeds to the next step S216. At the step S216, a flickering display is made to show that the title No. of the selection title is changeable. At a step S217, a check is made to find if the set dial 4 is in an on-state. If so, the flow proceeds to a step S218. At the step S218, the setting of the title No. of the selection title is serially changed. The flow then proceeds from the step S218 to the step S219 shown in FIG. 7.

Figure 7:
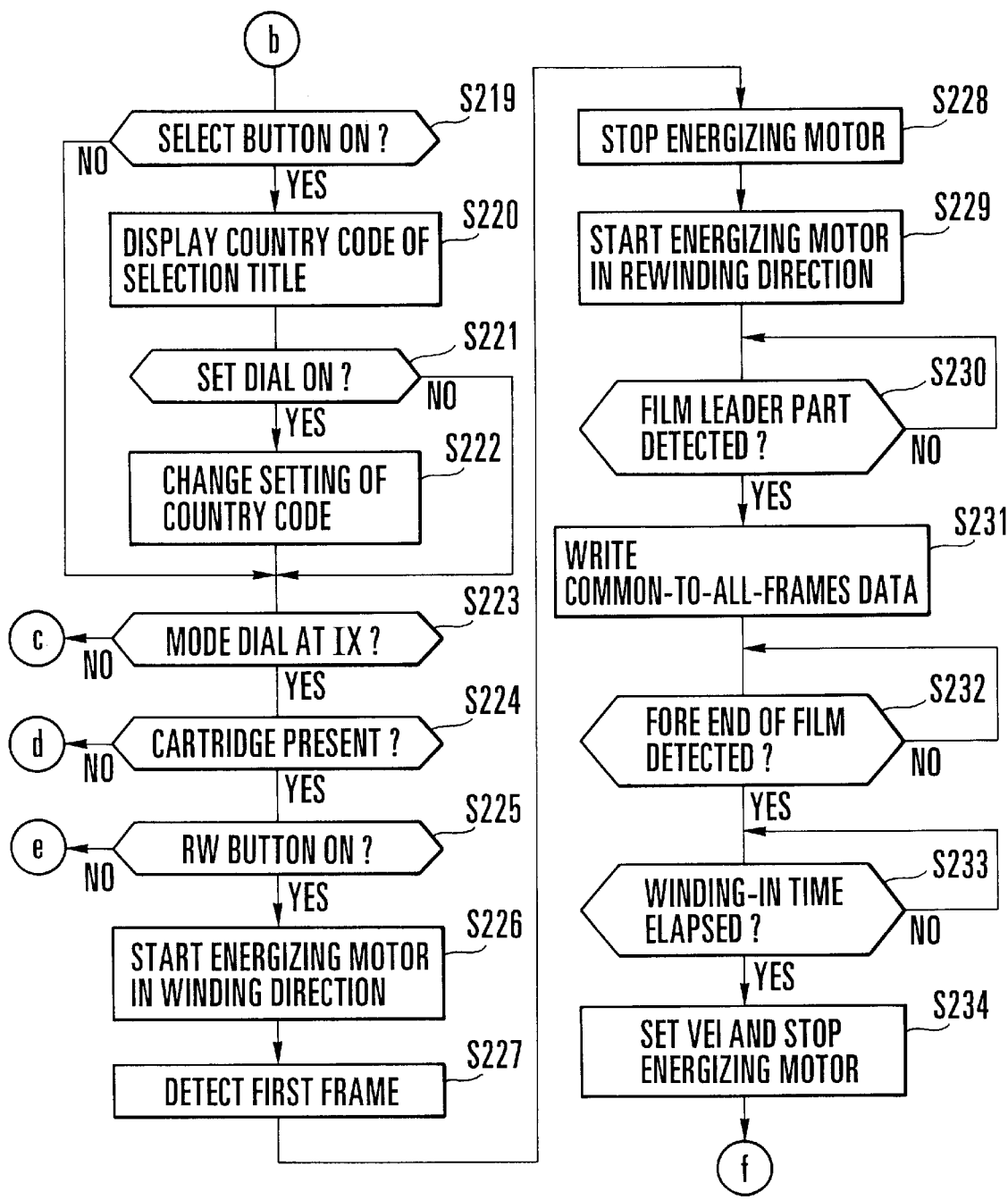
FIG. 7 is a flow chart showing the film rewinding sequence continuing from FIG. 6.

At the step S219 of FIG. 7, a check is made for the state of the SELECT button 8. If the SELECT button 8 is found in an on-state, the flow proceeds to a step S220. At the step S220, the country code of the selection title is flickeringly displayed to show that the country code can be changed. At a step S221, a check is made to find if the set dial 4 is turned on. If so, the flow proceeds to a step S222 to change the setting of the country code.

The selection title in the common-to-all-frames data is set in the manner as described above. The selection title, the title No. and the country code of frame data shown in the flow charts of FIGS. 4 and 5 are in common with other frame data.

At a step S223, a check is made to find if the mode dial 5 is still in the position of the IX mode. If so, the flow proceeds to a step S224. If the position of the mode dial 5 has been shifted to some other mode, the flow returns to the step S208 of FIG. 6. At the step S224, a check is made for the state of the cartridge detecting switch 26 to find if the cartridge exists in the cartridge chamber. If not, the flow returns to the step S211 of FIG. 6. If so, the flow proceeds to a step S225. At the step S225, a check is made to find if the RW button 9 is pushed. If not, the flow returns to the step S213 of FIG. 6. If so, the changing action on the setting of the common-to-all-frames title is judged to have finished, and the flow proceeds to a step S226 to start a sequence of processes of rewriting common-to-all-frames data.

At the step S226, the motor driver 19 is caused to start energizing the film transport motor 20 in the direction of film winding. At a step S227, the picture plane of the first frame of the film is indexed by using a signal coming from the photo-reflector 24. At a step S228, the process of energizing the film transport motor 20 is brought to a stop. At a step S229, a process of energizing the film transport motor 20 in the direction of film rewinding begins. At a step S230, the signal from the photo-reflector 24 is checked for detection of the leader part of the film. When the leader part of the film is detected, the flow proceeds to a step S231. At the step S231, the magnetic recording head 21 is caused to record the common-to-all-frames data in the leader part of the film which has been completely used (exposed) for photo-taking. More specifically, the common-to-all-frames data is rewritten by using, as the latest information, the selection title data set at the steps S212 to S222.

At t he next step S232, the signal from the photo-reflector 24 is checked for detection of the fore end of the film. When the fore end of the film is detected, the flow proceeds to a step S233. At the step S233, the flow waits for the lapse of a period of time required for winding the film into the film cartridge. At a step S234, the VEI of the film cartridge is set, and the process of energizing the film transport motor 20 is brought to a stop. The flow then shifts to the step S209 of FIG. 6 to execute the step S209 and steps subsequent thereto.

According to the embodiment described above, the RW button 9 is used both as a record changing operation member and a film rewinding operation member. This arrangement not only permits reduction in number of operation members but also improves operability.

Since in the embodiment the common-to-all-frames data is recorded in the leader part of the film, magnetic information can be recorded within a relatively short period of time after completion of the film rewinding.

Further, since the RW button 9 which is used as the record changing operation member is configured as shown in FIG. 2, any erroneous operation by the user can be prevented, and the RW button 9 is readily operable by the user. That arrangement effectively eliminates the troublesomeness of operation.

The individual components shown in schematic or block form in the drawings are all well-known in the camera arts and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, the invention applies also to an image recording medium other than a film.

The invention applies also to a case where information is to be recorded or read out on and from a film by some means other than magnetic means, such as electronic means and optical means.

The invention applies to cases where either the whole or a part of claims or the arrangement of the embodiment described forms one apparatus or is used in combination with some other apparatus or as a component element of an apparatus.

Further, the invention is applicable to cameras of varied kinds, such as a single-lens reflex camera, a lens-shutter type camera, a video camera, etc., optical apparatuses other than cameras, devices adapted for cameras, optical apparatuses and other apparatuses, and component elements forming these apparatuses and devices.

I claim:

1. A camera adapted for a film having an information recording part, said camera having plural modes comprising:
   a recording circuit which records information on the information recording part of the film,
   a mode change-over member which selects one of the plural modes and changes over the camera mode to the selected mode,
   an operation member,
   a film transporting mechanism,
   a rewinding control circuit which causes said film transporting mechanism to perform an all-frames rewinding operation in response to an operation of the operation member when the mode selected by the mode change-over member is a first mode, said rewinding control circuit being non-operative when the mode is a second mode,
   a re-recording control circuit which causes said recording circuit to write in information on the recording part on which information has already been recorded by the recording circuit in response to an operation of the operation member when the mode selected by the mode change-over member is a second mode, said re-recording control circuit being non-operative when the mode is the first mode.

2. A camera according to claim 1, wherein said recording circuit records information on a recording part provided on each frame every time each frame is photographed.

3. A camera according to claim 2 wherein said re-recording control circuit records information on the recording part of each frame recorded every time each frame is photographed.

4. A camera according to claim 3, wherein said re-recording control circuit has a film transportation control circuit which performs a one-frame winding operation after a one-frame rewinding operation by the film transportation mechanism, and a write-in operation circuit which causes the recording circuit to write in information during the one-frame winding operation.

5. A camera according to claim 1, wherein said first mode includes plural photographing modes.

6. An apparatus adapted for an image recording medium having an information recording part, said apparatus having plural modes, comprising:
   a recording circuit which records information on the information recording part of the medium,
   a mode change-over member which selects one of the plural modes and changes the apparatus mode to the selected mode,
   an operation member,
   a transportation mechanism for transporting the medium,
   a rewinding control circuit which causes said medium transportation mechanism to rewind the medium to an initial state in response to an operation of the operation member when the mode selected by the mode change-over member is a first mode, said circuit being non-operative when the mode is a second mode, and
   a re-recording control circuit which causes said recording circuit to write in information on the recording part on which information has already been recorded by the recording circuit in response to an operation of the operation member when the mode selected by the mode change-over member is a second mode, said re-recording circuit being non-operative when the mode is the first mode.

* * * * *